3,048,622
PREPARATION OF ALPHA-KETOESTERS

Harry A. Stansbury, Jr., South Charleston, and Howard R. Guest, Charleston, W. Va., assignors to Union Carbide Corporation, a corporation of New York
No Drawing. Filed Dec. 16, 1960, Ser. No. 76,149
18 Claims. (Cl. 260—483)

This invention relates, in general, to alpha-ketoesters and more particularly to a novel method of producing alpha-ketoesters from lower alkyl alpha-hydroxy, beta, gamma-unsaturated esters.

The alpha-ketoesters produced according to this invention are known in the art and the uses therefor have been previously disclosed. For example, the use of alpha-ketoesters as chemical intermediates in the production of alpha-amino acids by reductive animation is described in Sidgewick, Organic Chemistry of Nitrogen, page 115 (1937). Alpha-ketoesters also find utility as valuable chemical intermediates in numerous other reactions.

Although methods for preparing alpha-ketoesters have been described in the prior art, each of these methods suffers from certain disadvantages which prevents the commercial adaptation thereof. For example, the process described by Wright in U.S. Patent No. 2,751,343 (1956), requires the use of expensive and difficultly obtainable starting materials which renders that process unattractive for commercial adaptation. Another known process for preparing alpha-ketoesters involves the treatment of an alkyl alpha-hydroxy beta, gamma-unsaturated ester with boiling aqueous potassium carbonate solution [Ramband et al., Compte Rendus 223, pages 381–383 (1946); Chem. Abstracts 41, page 708 (1947)]. This latter process, however, suffers from several serious disadvantages as follows: (1) the alpha-keto acid produced is subject to aldol condensation in the presence of the alkaline potassium carbonate, and (2) the recovery of pure keto acid from the potassium salt contained in the aqueous alkaline solution is very difficult, thus necessitating cumbersome and involved separation procedures.

It is an object of the present invention to provide a novel process for the production of alpha-ketoesters. It is a further object of this invention to provide a process for the production of alpha-ketoesters, which process eliminates the need for expensive reactants and involved, cumbersome recovery procedures; and which is, therefore, readily adapted for full scale commercial operation. This is in direct contrast to the known methods discussed above.

Other objects of our invention will be readily apparent to those skilled in the art in view of the following more detailed description.

In accordance with the foregoing objects, we have discovered that alpha-ketoesters may be readily prepared by isomerizing vaporized beta, gamma-unsaturated alpha-hydroxy esters. The isomerization reaction proceeds in accordance with the following general equation:

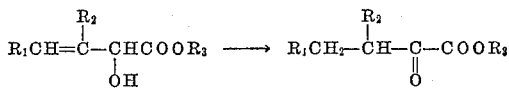

where $R_1$ and $R_2$ represent hydrogen or a lower alkyl group containing from 1 to 6 carbon atoms and $R_3$ represents a lower alkyl group containing from 1 to 6 carbon atoms.

Reaction temperatures may vary between about 150° C. and 380° C. depending upon the reactant employed. We prefer to use temperatures within the range of from about 180° C. to 300° C. since this range in most cases results in the greatest yields. It is obvious that the best temperature range for any particular starting material may be readily determined by routine empirical test.

The reaction proceeds quite satisfactorily at atmospheric pressure and this is thus the preferred pressure. Pressures varying from about 400 millimeters of mercury, absolute to about 50 p.s.i.g. (pounds per square inch gauge) may be used, if desired. At pressures greater than about 50 p.s.i.g., the vaporization of the hydroxyester starting material becomes difficult, and when the pressure is below about 400 millimeters of mercury absolute, the temperature of the vaporized hydroxyester is below that required for the isomerization to proceed.

The best correlation of temperature and pressure within the above ranges so as to obtain optimum results for any specific starting material may be readily determined by one skilled in the art through the use of a few simple empirical test runs.

Although the isomerization reaction described above will proceed satisfactorily in an unpacked reactor, we prefer the use of a reaction zone at least partially filled with a solid material which will act as a catalyst for the reaction. Catalytic materials which have been found to be especially efficacious in the practice of our invention are the alkali metal and alkali earth metal phosphates, aluminates, borates and silicates. The use of these compounds or mixtures thereof as catalysts in our process is, therefore, particularly preferred. The term "alkali metal," as used herein, is meant to include any one of the metals, lithium, sodium, potassium, rubidium and cesium or mixtures thereof. The term "alkali earth metals," as used herein, is meant to include calcium, barium, strontium, magnesium, cadmium and zinc or mixtures thereof. Our most particularly preferred catalyst is solid lithium phosphate, having a particle size in the range of from 4 to 8 mesh, the use of which results in the optimum balance between catalyst efficiency and cost.

Other useful catalysts for the practice of our invention may be prepared by impregnating a support material (such as silicon carbide) with an alkaline reagent (such as potassium hydroxide solution) and drying the mass, after which it may be used as a catalyst. "Filtros" (a weakly alkaline silica available from the Filtros Corporation) may also be used as a catalyst. Strongly acidic materials, such as silica gel, will promote undesirable side reactions such as dehydration and, hence, should not be used.

When a catalytic material, as defined hereinabove, is used in the practice of our invention, the catalyst particle size may lie within any range which permits the filling of the reaction zone and, at the same time, permits efficient vapor-solid contact between the gaseous alpha-hydroxy, beta, gamma-unsaturated ester starting material and the solid catalyst material. The specific particle size needed for practical operation with any of the aforementioned catalysts will be readily apparent to anyone skilled in the art. As previously noted, we have found that the best particle size range for our most particularly preferred catalyst, lithium phosphate, is from 4 to 8 mesh, U.S. sieve series.

It is obvious that the time of reaction may be any period of time sufficient to at least partially isomerize the hydroxy ester starting material. It is also obvious that the time required for isomerization to occur will vary according to the particular starting material, reaction temperature and reaction pressure chosen. When operating within the broad limits of temperature and pressure disclosed herein, and when employing a catalytic material, we have found that reaction times corresponding to feed rates of from about 5 grams to about 500 grams of vaporized alpha-hydroxy, beta, gamma-unsaturated ester starting material per liter of solid catalyst per hour may be used. Feed rates in the range between about 20 grams and about 200 grams of the said vaporized starting material per liter of solid catalyst per hour give especially good results and feed rates within this range are, thus, generally preferred. Feed rates to be used when the isomerization reaction is performed without the aid of a catalyst (that is, in an unpacked reactor) will also be within the range of from about 5 grams to about 500 grams of vaporized hydroxy ester starting material per liter of reactor volume per hour. Specific feed rates for obtaining optimum results with any particular starting material may be readily determined by one skilled in the art.

The alpha-hydroxy, beta, gamma-unsaturated esters used as starting materials in our invention are well known in the art. They may be readily produced by reacting cyanohydrins of alpha, beta-unsaturated aldehydes with mixtures of alcohols and hydrochloric acid. Unsaturated aldehydes useful in preparing the starting materials for our reaction include acrolein, methacrolein, crotonaldehyde, 2-ethylacrolein, 2-ethylcrotonaldehyde and the like. Methods of preparing the starting materials used in our invention from such aldehydes have been widely reported in the literature [Gudgeon et al., Journal of the Chemical Society, 1926–28 (1951); Gudgeon et al., U.S. Patent No. 2,232,943 (1941); Glattfield et al., Journal of the American Chemical Society 62, 354–6 (1940); Von der Sleen, Rec. Trav. chim. 21, 216 (1902); Lobry de Bruyn, Rec. Trav. chim. 4, 221 (1885)]. As indicated above, the starting materials of our invention have the following general formula:

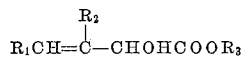

wherein $R_1$, $R_2$ and $R_3$ have the same significance as previously described. Specific compounds which may be used include:

Methyl 2-hydroxy-3-buteneoate,
Ethyl 2-hydroxy-3-buteneoate,
n-Butyl 2-hydroxy-3-buteneoate,
n-Propyl 2-hydroxy-3-buteneoate,
Isopropyl 2-hydroxy-3-buteneoate,
Isobutyl 2-hydroxy-3-buteneoate,
Sec-butyl 2-hydroxy-3-buteneoate,
Tert-butyl 2-hydroxy-3-buteneoate,
n-Amyl 2-hydroxy-3-buteneoate,
Isoamyl 2-hydroxy-3-buteneoate,
Tert-amyl 2-hydroxy-3-buteneoate,
n-Hexyl 2-hydroxy-3-buteneoate,
2-ethylbutyl 2-hydroxy3-buteneoate, and the like.
Methyl 2-hydroxy-3-methyl-3-buteneoate,
Methyl 2-hydroxy-3-methyl-3-penteneoate,
Methyl 2-hydroxy-3-methyl-3-hexeneoate,
Methyl 2-hydroxy-3-methyl-3-hepteneoate,
Methyl 2-hydroxy-3-methyl-3-octeneoate, and
Methyl 2-hydroxy-3-methyl-3-noneneoate.

Other compounds which may be used are the 3-alkyl substituted ethyl, propyl, butyl, amyl and hexyl esters of 2-hydroxy-3-butenoic acid corresponding to the 3-alkyl substituted methyl esters, described immediately above. Also suitable are the unsubstituted esters which result when $R_1$, in the general formula shown above, is a lower alkyl group, such as, for example:

Methyl 2-hydroxy-3-penteneoate,
Methyl 2-hydroxy-3-hexeneoate,
Methyl 2-hydroxy-3-hepteneoate,
Methyl 2-hydroxy-3-octeneoate,
Methyl 2-hydroxy-3-noneneoate, and
Methyl 2-hydroxy-3-deceneoate.

Similarly, the ethyl, butyl, propyl, amyl and hexyl esters of 2-hydroxy-3-butenoic acid having lower alkyl (1–6 carbon atoms) substituents in the 4-position may also be used, as well as other similar derivatives of 2-hydroxy-3-buteneoates having lower alkyl substituents in both of the 3- and 4-positions simultaneously.

Our invention will be more fully comprehended by referring to the following specific examples. It is understood that the invention is not to be limited to the exact details of operations or specific compounds shown and described in the examples, since obvious modifications and equivalents will be apparent to those skilled in the art, especially in view of the preceding discussion. The scope of the invention should, therefore, be determined only in accordance with the appended claims.

EXAMPLE 1

*Production of Methyl 2-Oxobutyrate*

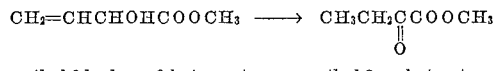

methyl 2-hydroxy-3-buteneoate     methyl 2-oxobutyrate

A one-inch stainless steel tube fitted with a Dowtherm filled jacket was charged with sufficient lithium phosphate (4 to 8 mesh) to occupy a volume of 300 milliliters. The lithium phosphate was heated to a temperature within the range of from about 250° C. to about 265° C. and maintained within that temperature range throughout the reaction. Vaporized methyl 2-hydroxy-3-buteneoate was passed over the heated catalyst at a rate of about 50 milliliters per hour for a period of 4 hours. This corresponds to a total quantity of about 218 grams of starting material fed to the reaction zone. The vapors exiting from the reaction zone were condensed and the 171 grams of crude liquid thereby obtained was fractionated under reduced pressures (that is, at about 10 millimeters of mercury absolute). The 39 grams of low boiling fraction was condensed and was found to consist essentially of methyl 2-oxobutyrate, while the 60 grams of higher boiling fractions consisted essentially of the methyl 2-hydroxy-3-buteneoate starting material. Properties of the two compounds are summarized below:

|  | Methyl 2-hydroxy-3-buteneoate | Methyl 2-oxobutyrate |
|---|---|---|
| Boiling Point, ° C. at 10 millimeters of mercury absolute, ° C. | 55 | 45 |
| Refractive index $n/D$ at 30° C. | 1.4350 | 1.4099 |
| Specific gravity at 20/20, ° C. | 1.098 | 1.068 |
| Miscible with water | Yes | No |

After taking into consideration the mechanical losses and products contained in the middle boiling fractions, the ketoester product yield was 23 percent, while the reaction efficiency (recovered product divided by net input times 100) was 50 percent. The assigned structure for methyl 2-oxobutyrate was confirmed by infrared absorption analysis. Analytical saponification of the refined ketoester indicated an equivalent weight of 110 as compared to a theoretical equivalent weight of 116.

EXAMPLE 2

*Preparation of Methyl 3-Methyl-2-Oxobutyrate*

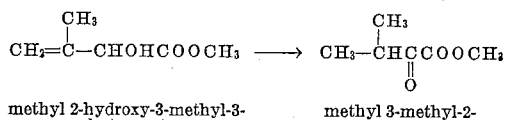

methyl 2-hydroxy-3-methyl-3-buteneoate     methyl 3-methyl-2-oxobutyrate

The jacketed tube and catalyst were identical with those described in Example 1. The catalyst was maintained within a temperature range of from about 290° C. to about 310° C. About 270 grams of vaporized methyl 2-hydroxy-3-methyl-3-buteneoate were fed to the reaction zone containing the heated catalyst at a rate of 40 milliliters per hour for a period of 6 hours. The crude product was condensed and then fractionated as described in Example 1. The low boiling fraction was found to consist essentially of methyl 3-methyl-2-oxobutyrate having the following properties:

Boiling point at 10 millimeters of mercury absolute, ° C. _____ 49
Refractive index, n/D at 30° C. _____ 1.4061
Specific gravity, 20/20, ° C. _____ 1.011
Miscible with water _____ No Corresponding data for the methyl 2-hydroxy-3-methyl-3-buteneoate starting material in these same tests are: 62° C.; 1.4392; 1.068 and Yes, respectively.

After taking into consideration mechanical losses and products contained in the middle boiling fractions, the ketoester product yield for this example was 42 percent, while the reaction efficiency was 57 percent, determined as in Example 1. The assigned structure was confirmed by infrared absorption data. Analytical saponification of the refined ketoester indicated an equivalent weight of 134.5 as compared to the theoretical equivalent weight of 130.

EXAMPLE 3

*Preparation of Ethyl 2-Oxobutyrate*

$$CH_2=CHCHOHCOOC_2H_5 \longrightarrow CH_3CH_2\overset{O}{\underset{\|}{C}}-COOC_2H_5$$

ethyl 2-hydroxy-3-buteneoate → ethyl 2-oxobutyrate

The jacketed tube and catalyst were identical to those described in Example 1. The catalyst was maintained at a temperature within the range of from about 250° C. to about 258° C. and vaporized ethyl 2-hydroxy-3-buteneoate was fed to the reaction zone at a rate of 56 grams per hour for 4 hours. The ethyl 2-oxobutyrate product, recovered by fractionation procedures as described in the previous examples, had the following properties:

Boiling point at 10 millimeters of mercury absolute, ° C _____ 51
Refractive index, n/D at 30° C _____ 1.4094
Specific gravity, 20/20, ° C _____ 1.014
Miscible with water _____ No Corresponding data for the ethyl 2-hydroxy-3-buteneoate were: 60° C.; 1.4295; 1.047 and Yes, respectively.

The product yield and reaction efficiency were determined as in Example 1 and were found to be 20 percent and 42 percent, respectively. The assigned structure for ethyl 2-oxobutyrate was confirmed by infrared absorption data.

EXAMPLE 4

*Production of Ethyl 3-Methyl-2-Oxobutyrate*

$$\underset{\text{ethyl 2-hydroxy-3-methyl-3-buteneoate}}{\overset{CH_3}{\underset{|}{CH_2=C}}CHOHCOOC_2H_5} \longrightarrow \underset{\text{ethyl 3-methyl-2-oxobutyrate}}{\overset{CH_3}{\underset{|}{CH_3-CH}}\overset{O}{\underset{\|}{C}}-COOC_2H_5}$$

The apparatus, catalyst and general procedures used in this example were the same as described in the previous examples. The catalyst was maintained at a temperature of about 300° C. and about 57 grams of vaporized ethyl 2-hydroxy-3-methyl-3-buteneoate were fed to the eraction zone over a period of one hour. The recovered ethyl 3-methyl-2-oxobutyrate had the following properties:

Boiling point at 10 millimeters of mercury absolute, ° C _____ 54
Refractive index, n/D at 30° C _____ 1.4090
Specific gravity, 20/20, ° C _____ .973
Miscible with water _____ No Corresponding data for the starting material are: 70° C.; 1.4340; 1.026 and No, respectively.

The product yield and reaction efficiency were determined as in the previous examples and were found to be 29 percent and 80 percent, respectively. The assigned structure for the ketoester product was confirmed by infrared absorption data. Analytical saponification of the refined ketoester indicated an equivalent weight of 131. The theoretical equivalent weight is 144.

In each of the foregoing examples, the reaction temperatures shown were determined by means of a thermocouple inserted in a thermowell imbedded in the catalyst. Other means of determining and controlling the temperature of the reaction will be obvious to those skilled in the art.

What is claimed is:

1. A process for the preparation of alpha-ketoesters having the general formula:

$$R_1CH_2-\underset{|}{\overset{R_2}{CH}}\underset{\|}{\overset{}{C}}-COOR_3$$
$$\phantom{R_1CH_2-CHC-}O$$

wherein $R_1$ and $R_2$ are members of the group consisting of hydrogen and lower alkyl radicals and wherein $R_3$ is a lower alkyl radical, which comprises vaporizing an alpha-hydroxy unsaturated ester of the general formula:

$$R_1CH=\underset{|}{\overset{R_2}{C}}-CHOHCOOR_3$$

wherein $R_1$, $R_2$ and $R_3$ have the same significance as above; heating said vaporized hydroxy ester to a temperature within the range of from about 150° C. to about 380° C.; maintaining the said hydroxy ester within the above temperature range for a period of time sufficient to at least partially isomerize said hydroxy ester to an alpha-ketoester; and recovering the alpha-ketoester from the product vapors.

2. The process of claim 1 wherein the reaction pressure is maintained between about 400 millimeters of mercury, absolute, and about 50 pounds per square inch gauge.

3. The process of claim 1 wherein the temperature is maintained within the range of from about 180° C. to about 300° C. and wherein the reaction is performed at atmospheric pressure.

4. A process for preparing alpha-ketoesters having the general formula:

$$R_1CH_2-\underset{|}{\overset{R_2}{CH}}\underset{\|}{\overset{}{C}}-COOR_3$$
$$\phantom{R_1CH_2-CHC-}O$$

wherein $R_1$ and $R_2$ are members of the group consisting of hydrogen and lower alkyl radicals and wherein $R_3$ is a lower alkyl radical, which comprises vaporizing an alpha-hydroxy unsaturated ester of the general formula:

$$R_1CH=\underset{|}{\overset{R_2}{C}}-CHOHCOOR_3$$

wherein $R_1$, $R_2$ and $R_3$ have the same significance as above; feeding said vaporized hydroxy ester into an unpacked reactor at a rate within the range of from about 5 grams to about 500 grams of said hydroxy ester per liter of reactor volume per hour while maintaining the internal temperature of said reactor within the range of from about 150° C. to about 380° C.; and recovering from the product vapors the alpha-ketoester thereby formed.

5. The process of claim 4 wherein the reaction pressure is maintained between about 400 millimeters of mercury, absolute, and about 50 pounds per square inch gauge.

6. The process of claim 4 wherein the internal temperature of said reactor is maintained in the range of from about 180° C. to about 300° C. and wherein the reaction is performed at atmospheric pressure.

7. The process of claim 6 wherein the said feed rate is in the range of from about 20 grams to about 200 grams per hour of said hydroxy ester per liter of reactor volume.

8. A process for the preparation of alpha-ketoesters having the general formula:

$$R_1CH_2-\underset{R_2}{\underset{|}{C}}HC-COOR_3$$
$$\underset{O}{\|}$$

wherein $R_1$ and $R_2$ are members of the group consisting of hydrogen and lower alkyl radicals and wherein $R_3$ is a lower alkyl radical, which comprises vaporizing an alpha-hydroxy unsaturated ester of the general formula:

$$R_1CH=\underset{R_2}{\underset{|}{C}}-CHOHCOOR_3$$

wherein $R_1$, $R_2$ and $R_3$ have the same significance as above; feeding said vaporized hydroxy ester into a reactor at least partially filled with a solid catalytic material and into contact with said catalytic material, said feeding being conducted at a rate within the range of from about 5 grams to about 500 grams of said vaporized hydroxy ester per liter of said catalytic material per hour; maintaining said catalytic material at a temperature within the range of from about 150° C. to about 380° C.; and recovering from the product vapors the alpha-ketoester thereby formed.

9. The process of claim 8 wherein said solid catalytic material is a member of the group consisting of alkali metal phosphates, alkali metal aluminates, alkali metal borates, alkali metal silicates, alkali earth metal phosphates, alkali earth metal aluminates, alkali earth metal silicates and alkali earth metal borates and mixtures thereof.

10. The process of claim 8 wherein the reaction pressure is within the range of from 400 millimeters of mercury, absolute, to about 50 pounds per square inch gauge.

11. The process of claim 10 wherein said catalytic material is lithium phosphate, having a particle size between 4 and 8 mesh.

12. The process of claim 11 wherein the temperature of the said lithium phosphate is maintained within the range of from about 180° C. to about 300° C. and wherein the reaction is performed at atmospheric pressure.

13. A process for preparing alpha-ketoesters having the general formula:

$$R_1CH_2-\underset{R_2}{\underset{|}{C}}H-C-COOR_3$$
$$\underset{O}{\|}$$

wherein $R_1$ and $R_2$ are members of the group consisting of hydrogen and lower alkyl radicals and wherein $R_3$ is a lower alkyl radical which comprises feeding a vaporized alpha-hydroxy unsaturated ester of the general formula:

$$R_1CH=\underset{R_2}{\underset{|}{C}}-CHOHCOOR_3$$

wherein $R_1$, $R_2$ and $R_3$ have the same significance as above into contact with a solid catalytic material selected from the group consisting of alkali metal and alkali earth metal phosphates, borates, aluminates and silicates and mixtures thereof, said feeding being conducted at a rate within the range of from about 5 grams to about 500 grams of said vaporized hydroxy ester per liter of said catalytic material per hour; maintaining the temperature of said catalytic material within the range of from about 150° C. to about 380° C.; condensing the product vapors obtained subsequent to said contacting; and recovering the alpha-ketoester portion of said condensed product vapors.

14. The process of claim 13 wherein the catalytic material is lithium phosphate, wherein the temperature is maintained between about 180° C. and about 300° C., wherein the reaction pressure is atmospheric and wherein the said feeding is conducted at a rate between about 20 grams and about 200 grams of said vaporized hydroxy ester per liter of said catalytic material per hour.

15. The process of claim 14 wherein $R_1$ and $R_2$ are hydrogen and wherein $R_3$ is a methyl radical, whereby the alpha-ketoester product recovered is methyl 2-oxobutyrate.

16. The process of claim 14 wherein $R_1$ is hydrogen, $R_2$ is a methyl radical and $R_3$ is a methyl radical whereby the ketoester product recovered is methyl 3-methyl-2-oxobutyrate.

17. The process of claim 14 wherein $R_1$ and $R_2$ are hydrogen and wherein $R_3$ is an ethyl radical, whereby the alpha-ketoester product recovered is ethyl 2-oxobutyrate.

18. The process of claim 14 wherein $R_1$ is hydrogen, $R_2$ is a methyl radical and $R_3$ is an ethyl radical whereby the alpha-ketoester product recovered is ethyl 2-methyl-2-oxobutyrate.

References Cited in the file of this patent

UNITED STATES PATENTS 2,847,432     Steadman et al.  --------  Aug. 12, 1958